(12) United States Patent
Kalsnes

(10) Patent No.: US 6,321,997 B1  
(45) Date of Patent: Nov. 27, 2001

(54) METHOD FOR OPERATING A STOVE IN A BUILDING, AND A DEVICE FOR CARRYING OUT THIS METHOD

(76) Inventor: Helge Kalsnes, P.O. Box 348, N-7801 Namsos (NO)

( * ) Notice: Subject to any disclaimer, the term of this patent is extended or adjusted under 35 U.S.C. 154(b) by 0 days.

(21) Appl. No.: 09/424,231
(22) PCT Filed: May 29, 1998
(86) PCT No.: PCT/NO99/00160
  § 371 Date: Feb. 2, 2000
  § 102(e) Date: Feb. 2, 2000
(87) PCT Pub. No.: WO98/57099
  PCT Pub. Date: Dec. 17, 1998
(51) Int. Cl.[7] .................................................. F24F 7/00
(52) U.S. Cl. ........................... 237/46; 454/238; 454/251
(58) Field of Search ....................... 237/47, 48; 454/238, 454/251, 255, 340

(56) References Cited

U.S. PATENT DOCUMENTS

| | | | | |
|---|---|---|---|---|
| 169,300 | * | 10/1875 | Satterlee | 454/70 |
| 2,610,565 | * | 9/1952 | Stuart | 454/70 |
| 3,611,906 | * | 10/1971 | Lorenz | 454/70 |
| 4,022,117 | * | 5/1977 | Mallian | 454/70 |
| 4,184,538 | * | 1/1980 | Rauenhorst | 165/66 |
| 4,270,513 | * | 6/1981 | Mitchelson | 126/121 |
| 4,280,474 | * | 7/1981 | Ruegg, Sr. | 126/141 |
| 4,498,624 | * | 2/1985 | Kogut | 237/53 |
| 4,538,508 | * | 9/1985 | Ballard | 454/70 |
| 5,131,887 | * | 7/1992 | Traudt | 454/255 |
| 5,191,874 | * | 3/1993 | McWilliams | 126/312 |
| 5,984,773 | * | 11/1999 | Gervais et al. | 454/70 |

* cited by examiner

*Primary Examiner*—Harold Joyce
*Assistant Examiner*—Derek S. Boles
(74) *Attorney, Agent, or Firm*—Dennison, Scheiner, Schultz & Wakeman

(57) ABSTRACT

Method to operate a combustion device in a house or similar building, with fossil fuel furnaces, such as wood or oil furnaces. Outdoor air is supplied to a heat exchanger that is connected to the smoke tube of the furnace, in such an amount that an interior excess pressure is created, as excess air is led out of the interior of the building through one or more exhaust openings, especially exhaust devices, which are located at low places in the building at its outer side. This offers better combustion efficiency, better energy-utilization and a more uniform temperature in the building. A device for operating the method, comprises a fan (23) which takes in air from an inlet (19) near the outer walls of the building, through a tube (24) leading to the furnace, with a heat exchanger (33, 34) enclosing some of the smoke tube (18) of the furnace (17). The fan (23) is dimensioned and operated to create an overpressure in the building. There exists at least one overflow valve (25) placed in the lower parts of the building, near its outer wall, which opens upon a low inner pressure.

9 Claims, 1 Drawing Sheet

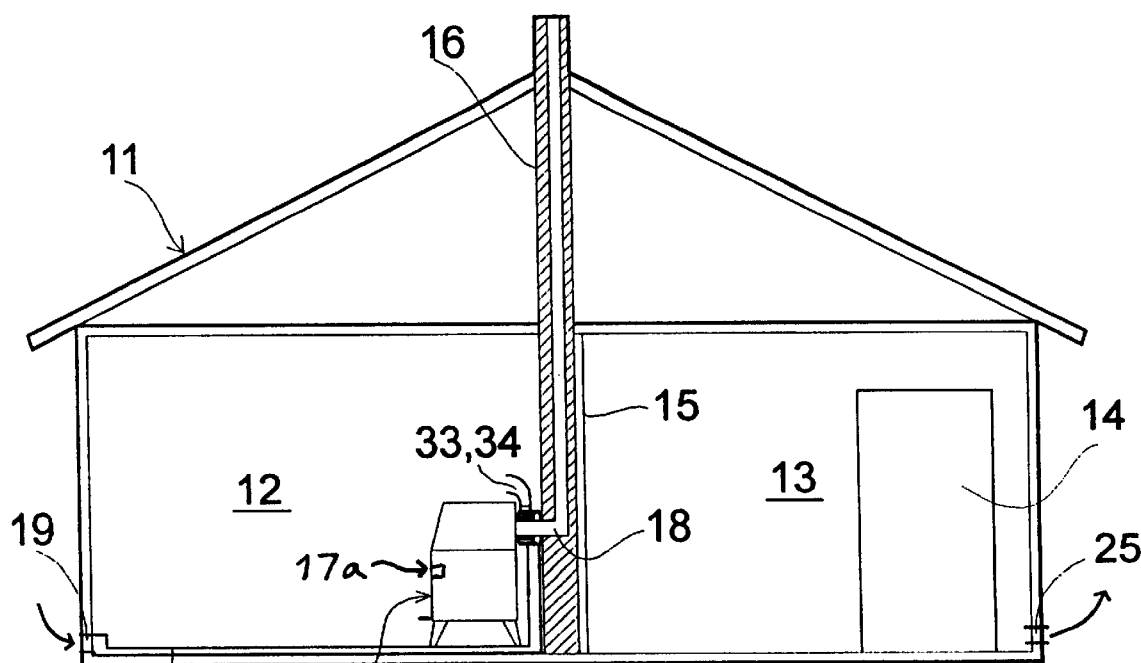
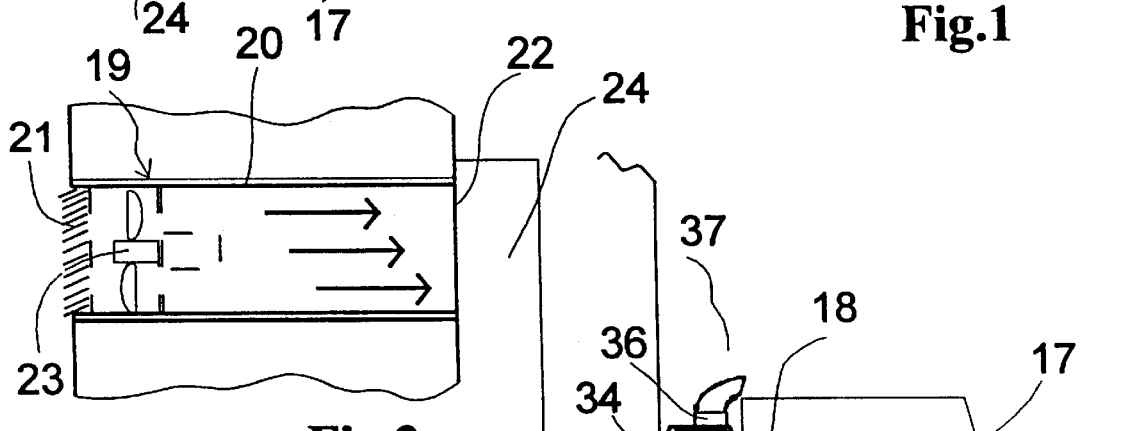
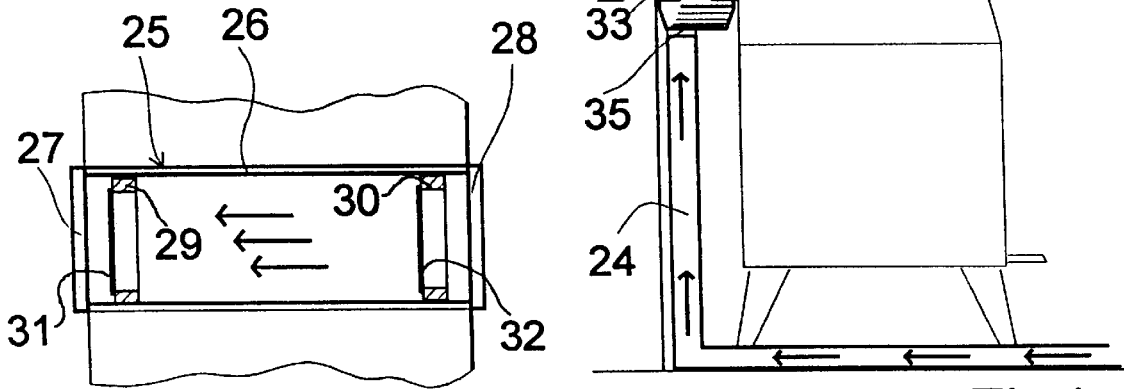
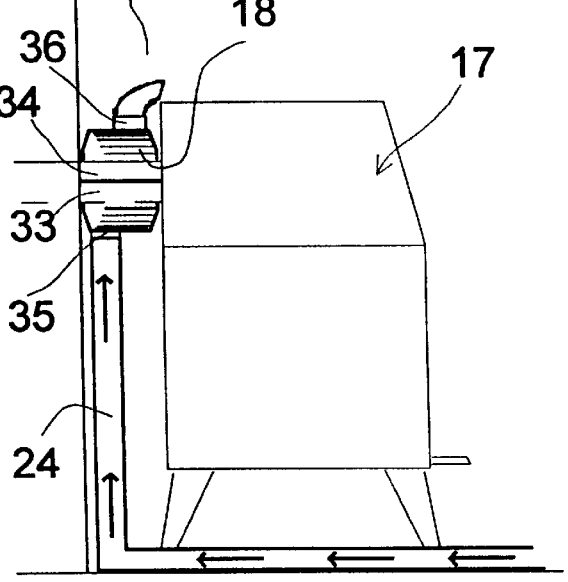

METHOD FOR OPERATING A STOVE IN A BUILDING, AND A DEVICE FOR CARRYING OUT THIS METHOD

BACKGROUND

There are several disadvantages concerning use of a combustion furnace in houses and similar buildings. In order to supply air for combustion, cold air are drawn in from various leaks in the building. Draughts and unequal temperature allocation will thus arise, with high temperatures around the furnace and cold spots at areas where the cold air is drawn in.

From Norwegian patent publication 59825, blowing air around a furnace is known. Simultaneously, it is suggested to suck outdoor air into the room. This heat exchange offers poor control of the air currents, both concerning whereform and whereto. The furnace temperature is reduced as is the corresponding combustion efficiency.

In U.S. Pat. No. 2,610,565 the inner negative pressure in rooms with combustion furnaces, is reduced by sucking in filtered outdoor air. In this way the suction of uncontrolled and unfiltered air gets moderated. However this solution does not remove the disadvantages concerning the unequal temperature allocation in the building and the creation of condensation in cold and damp areas.

In addition to the combustion- and heating problems which hopefully will be improved, there is an unfortunate collection of gasses and evaporation in certain areas, in many houses or the similar with combustion furnaces. Gasses can originate from the foundation or may be secreted from cigarettes, products in the building or from pollution.

OBJECT

The main object of the invention is to create a method and a device of the said kind, which better utilizes the heat energy which is created in the combustion, and which offers a more uniform allocation of the temperature over the whole area which is to be heated. A special object is to draw in outdoor air, and supply it so that these conditions are optimal.

A further object is to raise the temperature at the coldest places in the area which are to be heated, where there may be poor insulation and/or draught, e.g. to avoid condensation of moisture.

Another object is to remove cold air and undesirable gasses from the building.

THE INVENTION

The method according to the invention is stated in patent claim 1, dependent claims states the advantageous details. Further patent claims 4–8 describe an embodiment of the device which is suited to carry out the method.

The invention relates in one respect to a method for utilizing the heat energy of a furnace, in a building such as a house, whereby the inside of the building is supplied with fresh outdoor air by a fan device, and this air is heat exchanged with the smoke tube of the furnace and released into the interior of the house.

According to the invention the interior of the building is supplied with enough outdoor air to establish an overpressure compared to the pressure outside the building.

The technical effect following use of combustion furnaces in buildings with an interior overpressure, made of preheated outdoor air, is that drifting of cold outdoor air through the ordinary leakage-points of the house, for example windows, door frames, and keyholes, are eliminated. The net positive effect of this is that the temperature of the air in the building generally becomes more uniform, and the danger of formation of moisture and rot damage at the ordinary leakage points is reduced.

Secondarily, there will always be an overpressure in the air supply to the furnace, compared to the pressure at the flue outlet, and in this way, the furnace is operated with increased oxygen supply, which in turn increases the combustion effect and utilization of the fire wood. It is also possible to reduce the spill of noxious gasses through the higher temperature in the smoke tube. Another positive effect of the invention is especially experienced when firing, since it gets a lot easier to set fire to, for example, fire wood in a wood-burning stove. One will therefore achieve a generally more uniform room temperature with lesser fuel consumption.

The term "overpressure" used herein, means that a differential pressure should be established which is sufficient to reverse the air current in leakage points and air exhaust lines, to a small outgoing current, which in turn will be sufficient to establish the technical effect which is sought by the invention. Therefore there are moderate claims to the effect of the fan.

The preheated fresh air is advantageously led straight to the area by the furnace. The preheating of the air can take place in an arbitrary familiar way, for example by using a mantel around the smoke tube. Such a technical solution requires a small building volume, and consequently low costs for installation and maintenance.

The outlet device can in its simplest form, be the natural leakage points in the house, for example a valve, but particularly in newer buildings it is preferred to use a dedicated outlet device, for example a dedicated overflow valve which is shaped for this object. It is preferred that the overflow valve is placed at normally cold places, for example at the floor level in lower places in the building.

In a basic, but preferred embodiment of the invention, the overflow valve is a self-regulating check valve, especially a membrane valve, which is arranged to close when the external pressure is higher than the pressure in the interior of the building, and to open at a pressure which is insignificant higher than the outdoor pressure.

In another embodiment, the overflow valve can be a distant regulated valve, connected to a regulator which coordinates intensity of the fan for supply of outdoor air, and opening of the outlet device via pressure values which are registered at pressure sensors for measuring the differential pressure between outdoor and the interior of the building. In houses with an extract fan for example in the kitchen, it could be appropriate to coordinate the intensity of the fan for fresh air and the intensity of the extract fan.

In windy areas where there are high winds much of the year, it could be appropriate to place more outlet devices at different wall sections in order to avoid stagnation pressure from outdoor wind which would otherwise restrain removal of excess air from the interior of the building.

It should also be mentioned that the method and device according to the invention can be used at warmer times of the year also, in order to establish sufficient air change in the building. By help of lower air outlets, the problems concerning accumulation of possible radongass and similar, are also avoided.

EXAMPLE

The invention is illustrated in the drawings, wherein

FIG. 1 shows a schematical section through a device according to the invention,

FIG. 2 shows a section through an inlet device,

FIG. 3 shows a section through an outlet device,

FIG. 4 shows a side section of an furnace for use in a device according to the invention.

FIG. 1 shows a building 11, e.g. house, which in this case is simplified to an inner room 12 and an outer room 13 with a front door 14. In the bulkhead 15 between the two rooms, is placed a smokepipe 16. In the bulkhead 15 there also exists a door opening, but this is not shown. Close to the smokepipe 16 is installed a wood-burning stove 17 with a smoketube 18 into the smokepipe. The wood-burning stove 17 could alternatively be a furnace or open fireplace, possible for burning fuels other than fire wood. The smoke tube may be led out of the room through a wall.

At the outer wall in the inner room 12 there is in an opening, placed within which is an inlet device 19 (FIG. 2) comprising a tube 20 with a damper 21 outside and a grid 22 inside. Inside the tube there is placed a fan 23 for induction of air from the atmosphere outside of the building 11 and into the building. The tube 20, is on the inside, connected to a tubeformed channel 24, which is layed along the wall in the inner room 12, to the smoketube 18.

The fan 23 can be controlled by a thermostat (not shown) that is placed at the smoke-tube 18, or another part of the furnace which will be heated rapidly as combustion begins. The thermostat may, for example, be set to start the fan at a temperature of about 50° C. in the smoketube. In addition, a pressure sensor may be arranged at the outer wall, that either indirectly or directly makes it possible to set the fan capacity such that an interior overpressure is developed. For this object, known components and connections may be used. A manually controlled electronic regulator may possibly be used to control the fan 23.

In order to let out air at the overpressure which is created in the method according to the invention, an outlet device 25 is provided at the floor near the front door 14, in the outer wall of the outer room 13. The temperature in this area is lowest in the building. By making such a controlled outlet, the coldest air in the building is removed. Also this area is where the concentration of undesirable gasses will be highest. It is possible to utilize more such outlet devices distributed in the building, and these would also be advantageously placed low, and close to areas with low temperature.

FIG. 3 shows an outlet device 25 comprising a tube 26 with an outward and an inward grid 27, 28 respectively. In each end of the tube 26 there is placed a ring 29, 30 with a hanging membrane 31, 32 which ensures one-way air passage, i.e. from the interior to the exterior. There are several possibilities for the shape of the outlet. In order to increase the closing pressure on the membrane in resting position, the rings may be slightly slanting, for example until 5°. The condition required is that the membranes or alternatively valve elements, react upon low overpressures, that is, down against 0 bar.

FIG. 4 shows a wood-burning stove 17 with a two-piece mantel 33, 34 around the smoketube 18, the two mantel halves might be identical, with a pipe socket 35 down against the smoke channel 24 from the inlet device (FIG. 1), and a pipe socket 36 upwards with a baffle 37 that distributes outflowing air over the upper side of the stove 17. With new catalyst-stoves the smoketube 18 will have an essentially higher temperature than in the past because of the afterburning effect, and thereby offering a basis for a better utilization of the heat energy. In addition, the mantel 33, 34 will protect against touch of the hot smoke tube 18. This is particularly valuable initially when the stove is heating, as the smoke tube 18 has gained already a dangerously high temperature.

What is claimed is:

1. In a heating system for heating an enclosure having at least one wall comprising a combustion device having a combustion chamber, an air inlet opening into the enclosure for drawing air from the enclosure into the combustion chamber and an exhaust gas outlet for expelling combustion gasses from the combustion chamber, the improvement comprising:

a heat exchanger connected to said exhaust gas outlet:

a passageway extending from a location outside the enclosure to the heat exchanger;

a fan blowing air from outside the enclosure against the heat exchanger and into the enclosure; and, an exhaust device separate from said exhaust gas outlet in a lower portion of the at least one wall for releasing air from said enclosure when the air pressure inside the enclosure exceeds the air pressure outside said enclosure.

2. The heating system of claim 1 wherein said exhaust device comprises at least one overflow valve adapted to open when the air pressure inside the enclosure exceeds the air pressure outside the enclosure by a minimal amount.

3. The heating system of claim 1 further comprising control means for regulating the fan, said control means including a differential pressure measurement device for measuring the air pressure inside the enclosure and the air pressure outside the enclosure.

4. The heating system of claim 1 wherein the heat exchanger surrounds a portion of the exterior of said exhaust gas outlet and wherein the fan is sized to produce a higher pressure in the enclosure than outside the enclosure.

5. The heating system of claim 4 wherein the heat exchanger comprises a mantel around the exhaust gas outlet at the upper portion of the combustion device.

6. The heating system of claim 1 wherein said exhaust device comprises a membrane valve placed in an area of the enclosure remote from the combustion device.

7. The heating system of claim 6 wherein the membrane valve comprises an annular ring in a tube, the ring being covered on the upper side of a freely hanging membrane.

8. The heating system of claim 3 wherein said control means comprises a thermostat positioned near the exhaust gas outlet, said control means activating the fan to create an overpressure in the enclosure when the temperature sensed by the thermostat is about 50° C.

9. A method for controlling a heating system for heating an enclosure having at least one wall, said heating system comprising a combustion device having a combustion chamber, an air inlet opening into the enclosure for drawing air from the enclosure into the combustion chamber and an exhaust gas outlet for expelling combustion gasses from the combustion chamber, comprising the steps of:

attaching a heat exchanger to said exhaust gas outlet:

connecting a passageway from a location outside the enclosure to the heat exchanger;

placing a fan in said passageway and blowing air from outside the enclosure against the heat exchanger and into the enclosure; and, providing an exhaust device separate from said exhaust gas outlet in a lower portion of the at least one wall and releasing air from said enclosure when the air pressure inside the enclosure exceeds the air pressure outside said enclosure.

* * * * *